United States Patent [19]

Meyer et al.

[11] Patent Number: 6,110,519

[45] Date of Patent: Aug. 29, 2000

[54] PROCESS FOR PREPARING FULLY COOKED PACKAGED SHELF STABLE OR FROZEN NOODLES

[75] Inventors: Philipp Paul Meyer, Benglen, Switzerland; Eugene Scoville, New Milford, Conn.; Göran Jaelminger, Helsingborg, Sweden

[73] Assignee: Nestec S.A., Vevey, Switzerland

[21] Appl. No.: 09/220,601

[22] Filed: Dec. 28, 1998

[30] Foreign Application Priority Data

Dec. 29, 1997 [EP] European Pat. Off. ............... 97204121

[51] Int. Cl.$^7$ ........................................................ A23L 1/16

[52] U.S. Cl. ........................ 426/401; 426/407; 426/451; 426/516; 426/517

[58] Field of Search ..................... 426/451, 557, 426/575, 516, 128, 401, 407, 517

[56] References Cited

U.S. PATENT DOCUMENTS

| | | | |
|---|---|---|---|
| 4,544,563 | 10/1985 | Lechthaler | 426/276 |
| 4,844,936 | 7/1989 | Cox et al. | 426/549 |
| 5,211,977 | 5/1993 | Hauser et al. | 426/557 |
| 5,332,587 | 7/1994 | Howard et al. | 426/128 |

FOREIGN PATENT DOCUMENTS

| | | |
|---|---|---|
| 105 100 A1 | 7/1983 | European Pat. Off. . |
| 336 080 | 2/1989 | European Pat. Off. . |
| 450 310 A1 | 1/1991 | European Pat. Off. . |
| 531 743 A1 | 8/1992 | European Pat. Off. . |
| 602 953 A3 | 12/1993 | European Pat. Off. . |
| 2 502 907 | 3/1982 | France . |
| WO 86/01683 | 3/1986 | WIPO . |

*Primary Examiner*—Nina Bhat
*Attorney, Agent, or Firm*—Pennie & Edmonds LLP

[57] ABSTRACT

A full moisture, shelf stable or frozen noodle product having a dry matter content between about 30% to about 45% by weight. This product contains a cooked flour or semolina of a starchy plant, softened water, a cooked starch, an ionic gelling agent, an emulsifier, a cation which has formed a gel with the ionic gelling agent, and an oil. If desired, an acid can be included to provide a pH between about 3.7 to about 4.5.

10 Claims, No Drawings

PROCESS FOR PREPARING FULLY COOKED PACKAGED SHELF STABLE OR FROZEN NOODLES

FIELD OF INVENTION

The present invention relates to a noodle product of the Beehoon type and to a process for its manufacture.

BACKGROUND OF THE INVENTION

Rice noodles known in South East Asia under the name of "Beehoon" are traditionally produced domestically and in small-scale by processes based on a small number of basic operations, including soaking grains of rice, wet milling, pre- and post-gelatinization, cooling and mechanical working of the dough. These basic operations are linked and/or repeated in order to give the rice dough cohesiveness. Beehoon noodles have an elastic texture, but also have a cohesion comparable with that of traditional noodles based on wheat.

U.S. Pat. No. 4,544,563 (Lechthaler) discloses a process for the production of starchy plant noodles of the Beehoon type by gelatinization, extrusion, and drying. More specifically, a dough is prepared having a water content of from 35% to 55% and comprises a flour or semolina of the starchy plant and an ionic gelling agent. The dough is gelatinized by heating and kneading under pressure, cooled to a temperature below 100° C., extruded in the form of pasta, immediately brought into contact with water containing a cation, which forms a gel with the ionic gelling agent, and dried.

SUMMARY OF THE INVENTION

The present invention relates to a full moisture, shelf stable or frozen noodle product having a dry matter content of from about 30% to about 45% by weight. If desired, an acid can be added in an amount sufficient to provide to the product a pH of between about 3.7 to about 4.5. This product comprises a cooked flour or semolina of a starchy plant, softened water, a cooked starch, an ionic gelling agent, an emulsifier, a cation which has formed a gel with the ionic gelling agent, and an oil.

The noodle product has a circular or oblong cross section between about 0.5 mm to about 3 mm in diameter or width. The noodle product also contains, in parts by weight on dry matter, between about 70 to about 100 parts of cooked flour or semolina of a starchy plant, between about 5 to about 30 parts of cooked starch, between about 0.2 to about 1.5 parts of ionic gelling agent, between about 0.5 to about 5 parts of emulsifier and between about 0.5 to about 5 parts of oil.

The present invention also encompasses a process for manufacturing a full moisture, shelf stable noodle product consisting of preparing a mixture having a dry matter content of from about 45% to about 60% by weight and comprising a flour or semolina of a starchy plant, softened water, a starch, an ionic gelling agent and an emulsifier, forming the noodle product by cooking-extrusion of the mixture, immediately bringing the noodle product into contact with water containing a cation which forms a gel with the ionic gelling agent, dewatering the noodle product, cutting and portioning it, water cooling it, dipping it into an acidified water, oiling it, packaging it and in pack pasteurizing it.

The present invention also encompasses a process for manufacturing these products by cooking-extrusion of the mixture, immediately bringing the noodle product into contact with water containing a cation which forms a gel with the ionic gelling agent, dewatering the noodle product, cutting it, water cooling it, oiling it, packaging it and freezing it. In a preferred embodiment, the cooking-extrusion is carried out under between about 70 to about 100 bar, at between about 60° C. to about 120° C. and for about 20 seconds to about 120 seconds.

In a preferred embodiment, the noodle product is brought into contact with a water containing a cation at a concentration between about 0.05 to about 0.2 moles/L for about 2 seconds to about 30 seconds and at a temperature between about 60° C. to about 70° C. If desired, the product can be frozen.

In another embodiment, the water-cooled noodle product is dipped into an acidified water containing between about 0.5% to about 1.5% acid at ambient temperature, preferably between about 18° C. to about 35° C., for between about 60 seconds to about 150 seconds. Preferably, the acid used to acidify the water in this process is a food grade acid, such as lactic acid, phosphoric acid, or a mixture thereof. Preferably, the packaged noodle product is in pack pasteurized at between about 80° C. to 100° C., for between about 1 minute to 80 minutes. Preferably, the dewatered noodle product is heat treated for between about 30 seconds to 90 seconds by water boiling, steam blanching, and/or passing under a hot water shower before being water cooled and dipped into an acidified water.

DETAILED DESCRIPTION OF THE INVENTION

The present invention relates to a full moisture, shelf stable or frozen noodle product of the Beehoon type that does not require the consumer to cook before consumption, but rather, to simply heat for a short time, and a process for its manufacture.

The process for manufacturing a full moisture, shelf stable or frozen noodle product according to the present invention which encompasses preparing a mixture or dough having a dry matter content between about 45% to about 65% by weight and comprising a flour or semolina of a starchy plant, softened water, a starch, an emulsifier and an ionic gelling agent, forming the noodle product by cooking-extrusion of the mixture, immediately bringing the noodle product into contact with water containing a cation which forms a gel with the ionic gelling agent, dewatering, cutting and portioning, water cooling, dipping into an acidified water, oiling, packaging and in pack pasteurizing the noodle product.

In the present disclosure, the expression "noodle product of the Beehoon type" means a noodle product which has the texture of traditionally made Beehoon noodles, namely an elastic texture but also having a cohesion comparable with that of traditional noodles based on wheat.

The noodle product according to the present invention preferably hash a circular or oblong cross section between about 0.5 mm to about 3 mm in diameter or width.

The present noodle product comprises, in parts by weight on dry matter, from about 70 to 100 parts of cooked flour or semolina of a starchy plant, between about 5 to about 30 parts of cooked starch, between about 0.2 to 1.5 parts of ionic gelling agent, between about 0.5 to about 5 parts of emulsifier and between about 0.5 to about 5 parts of oil.

In the present noodle product, the flour or semolina of the starchy plant may be derived from cereal grains, such as rice or maize, legumes such as soya, or tubers rich in starch, such as potato or yam, for example. The starch is preferably maize starch, potato starch or tapioca starch.

The ionic gelling agent is preferably an acid polysaccharide. More preferably the ionic gelling agent is an alginate.

The cation is typically an alkaline earth metal ion. Preferably, the cation is a divalent cation. More preferably, the cation is a divalent calcium cation.

The emulsifier is preferably a monoglyceride or a mixture of monoglycerides.

The acid may be any food grade acid. Preferably, the acid is lactic acid or phosphoric acid. A preferred amount of acid is that which provides a pH of about 3.8 to 4.3 to the product.

The oil typically is a vegetable oil. Preferably, the oil is peanut oil, rapeseed oil, sunflower oil, palm olein or mixtures thereof.

The present noodle product may further comprise between about 0.2 to 2 parts of hydrocolloid, such as guar gum, xanthan gum or carob bean flour, and between about 0.5 to about 5 parts of protein, such as wheat proteins, which is very useful in improving the stability and/or the integrity of the noodle product.

Soft water is used in the present invention. Preferably, the soft water contains a calcium ion concentration of less than about $4 \times 10^{-4}$ moles/L with a temperature between about 10° C. to about 90° C., preferably a temperature between about 60° C. to about 80° C.

A mixture is prepared which, beside soft water, preferably comprises, in parts by weight, between about 70 to about 100 parts of flour or semolina of a starchy plant, between about 5 to about 30 parts of starch, between about 0.2 to about 1.5 parts of ionic gelling agent, and between about 0.5 to about 5 parts of emulsifier.

The flour or semolina of a starchy plant may be a derived between rice, maize, semolina, soya, potatoes or yams, for example.

Cooking-extrusion of the mixture typically is carried out under between about 70 bar to about 100 bar, at from about 60° C. to about 120° C., and for about 20 seconds to about 120 seconds.

Extrusion is typically carried out through a die with holes of circular or oblong cross sections between about 0.5 mm to about 3 mm in diameter or width. The temperature of the noodle product is preferably adjusted during cooking-extrusion so that it is between about 100° C. to about 110° C. on discharge from the die.

The extruded noodle product is preferably brought into contact with water, containing the cation at a concentration between about 0.05 to about 0.2 moles/L and having a temperature between about 60° C. to about 70° C., for about 2 seconds to about 30 seconds.

Dewatering may be carried out by blowing air on the noodle product in order to remove the cation-containing water that remains on the surface of the noodle product.

The step of cutting and portioning may be carried out at any stage after the drying step and before the packaging step.

The dewatered and water cooled noodle product is preferably dipped into an acidified water containing between about 0.5% to about 1.5% acid, preferably lactic and/or phosphoric acid, at ambient temperature, preferably between about 18° C. to 35° C., and for about 60 seconds to about 150 seconds. After the acidifying step, excess water is drained off.

The oiling step is carried out so that the noodle product is covered with between about 0.5% to about 5% oil, with or without adequate emulsifier.

The oiled noodle product may be packed in a flexible pouch with a controlled volume of head space.

Eventually the packaged noodle product preferably is in pack pasteurized at from about 80 to about 100° C., for from about 1 minute to about 80 minutes.

In another embodiment of the present process, after having been dewatered, the noodle product is heat treated for about 30 seconds to about 90 seconds, preferably by water boiling, steam blanching and/or passing under a hot water shower, before being water cooled and dipped into an acidified water.

Surprisingly, this heating step notably helps to create the required texture during processing, as the present food product is not intended to be actually cooked again at the consumer's end, but only heated up or very shortly cooked after unpacking. Heating up or very shortly cooking the present food product after unpacking may be carried out in a pan, in a microwave oven, or by pouring hot or boiling water onto it, for example.

In a further embodiment of the present process, the steps consisting of dipping the noodle product into an acidified water, oiling it, packaging it and in pack pasteurizing it are replaced by steps consisting of directly oiling the noodle product, packaging it and freezing it.

In a corresponding further embodiment, the noodle product does not comprise an acid, but is frozen instead. In this embodiment, the present product may be thawed before or after unpacking, preferably during heating up or cooking shortly, for example.

The present process may be implemented by means of typical processing equipment, such as a cooking-extruder, a steeping unit, a dewatering unit, an optional steam blancher, and water baths and/or showers from the edible dough industry, for example.

The present invention may employ a twin screw cooking-extruder, which has a casing divided into successive double walled sectors with respective temperatures that may be adjusted by circulating fluids at appropriate temperatures. Such an extruder may be provided with an extrusion die consisting of a thick steel plate with holes of circular or oblong cross sections from about 0.5 mm to about 3 mm in diameter or width, for example.

The invention may be further defined by reference to the following examples describing in detail the preparation of the products and compositions used in the methods of the present invention, as well as their utility. The examples are representative and should not be construed to limit the scope of the invention. The percentages and parts used in the Examples are determined by weight.

EXAMPLES

Example 1: Preparation of Beehoon Noodles 75 parts of round-grain rice flour (Oryza sativa japonica) having a moisture content of from 12% to 14%, 20 parts of potato starch, 0.8 part of vegetable monoglycerides of, 0.2 part of guar gum flour, 1 part of sodium alginate and 3 parts of wheat protein were mixed to form a dry premix.

A mixture was prepared by feeding 100 parts of the dry premix and 61 parts of softened water, containing about $2 \times 10^{-4}$ moles of divalent calcium per liter, into a C 58 type Werner & Pfleiderer twin screw extruder where it was cooked-extruded at about 100° C. under about 95 bar for about 90 seconds.

The temperature of the cooked mixture was adjusted at the end of the extruding process to between 100° C. and 105° C. on discharge of the die.

The die consisted of a thick steel plate with 36 holes of circular cross section at 0.9 mm in diameter.

The extruded noodle product was immediately immersed in and drawn continuously for 10 seconds through a bath of water having a temperature of 60° C. and containing 0.16 moles of divalent calcium ions per liter, in the form of $CaCl_2$ or $CaCO_3$.

The noodle product was then dewatered, cut into length of about 400 mm to 420 mm and portioned into baskets about 90 g to 120 g in weight.

The portioned noodle product was steam blanched for 60 seconds with saturated steam at atmospheric pressure and passed under a hot water shower.

The steam blanched noodle product was cooled by dipping for 15 to 45 seconds into a bath of water having a temperature of 20° C. to 30° C.

The cooled noodle product was dipped for about 100 seconds into a bath of acidified water containing 1.0% of lactic acid and having a pH of 2.8.

The excess water was drained off.

The acidified noodle product was then oiled with palm olein, containing a few percent of vegetable monoglycerides, so that it was covered with a homogeneous oil film containing about 1% of its weight.

The oiled noodle product, which was already portioned, was packaged into plastic pouches and sealed, the pouches being 165 mm×145 mm and having about 30 mL to about 50 mL air as headspace.

The packaged noodle product was in pack pasteurized in hot air or water for about 35 minutes to 50 minutes at about 85° C. to 90° C.

The in pack pasteurized noodle product was cooled in tap water (treated with sanitizer) for 15 minutes or in chilled air for 40 minutes.

The obtained rice noodle product had a pH of between about 3.9 to 4.1 and a water content of between about 65% to 70%. Its temperature was about room temperature.

The rice noodle product could be prepared for consumption by unpacking and heating up.

The rice noodle product did not stick together and had a smooth surface and texture.

The rice noodle product had an elastic texture, but a cohesion comparable with that of traditional noodles based on wheat, as have the traditional rice noodles known by the name of Beehoon.

Example 2: Preparation of Beehoon Noodles 70 parts of maize flour, 15 parts of potato starch, 10 parts of maize starch, 0.8 part of monoglycerides of vegetable origin, 0.2 part of guar gum flour, 0.7 part of sodium alginate and 3 parts of wheat proteins were dry premixed.

A mixture was prepared by feeding 100 parts of the dry premix and 56 parts of softened water containing about $2 \times 10^{-4}$ moles of divalent calcium per liter into a C 58 type Werner & Pfleiderer twin screw extruder in which it was cooked-extruded at about 100° C. under about 95 bar for about 90 seconds.

The temperature of the cooked mixture was adjusted at the end of the extruder in order that it was between 100° C. and 110° C. on discharge of the die.

The die consisted of a thick steel plate with 36 holes of circular cross section from 0.9 mm in diameter.

The next steps of the process were carried out in the same way as disclosed in Example 1.

The in pack pasteurized maize noodle product thus obtained had a pH of between about 3.9 to 4.1 and a water content of between about 65% to 70%. Its temperature was about room temperature.

The maize noodle product could be prepared for consumption by unpacking and heating up.

The maize noodle product did not stick together and had a smooth surface and texture.

The maize noodle product had an elastic texture but a cohesion comparable with that of traditional noodles based on wheat, as have the traditional rice noodles known by the name of Beehoon.

What is claimed is:

1. A process for manufacturing a fully cooked, shelf stable or frozen noodle product which comprises of preparing a mixture having a dry matter content of from about 45% to about 65% by weight and comprising a flour or semolina of a starchy plant, softened water, a starch, an ionic gelling agent and an emulsifier, forming the noodle product by cooking-extrusion of the mixture, bringing the noodle product into contact with water containing a cation which forms a gel with the ionic gelling agent, dewatering the noodle product, cutting and portioning it, packaging it and in pack pasteurizing it.

2. The process of claim 1 which further comprises freezing the product.

3. The process of claim 1, wherein the cooking-extrusion is carried out at between about 70 to about 100 bar, about 60° C. to about 120° C. and for about 20 seconds to about 120 seconds.

4. The process of claim 1, wherein the noodle product is brought into contact with a water containing a cation at a concentration between about 0.05 to about 0.2 moles/L for about 2 seconds to about 30 seconds and having a temperature between about 60° C. to about 70° C.

5. The process of claim 1, which further comprises water-cooling the noodle product and dipping the water-cooled noodle product into an acidified water containing between about 0.5% to about 1.5% acid at ambient temperature for between about 60 seconds to about 150 seconds.

6. The process of claim 5, wherein the acid is lactic acid, phosphoric acid, or a mixture thereof, and the ambient temperature is between about 18° C. to 35° C.

7. The process of claim 5, wherein the dewatered noodle product is heat treated before being water cooled and dipped into an acidified water.

8. The process of claim 7, wherein heat treating is carried out for between about 30 seconds to 90 seconds by exposing the product to boiling water, or steam blanching, or a hot water shower.

9. The process of claim 1, wherein the packaged noodle product is in pack pasteurized at between about 80° C. to 100° C., for between about 1 to 80 minutes.

10. A process for manufacturing a fully cooked, shelf stable or frozen noodle product which comprises of preparing a mixture having a dry matter content of from about 45% to about 65% by weight and comprising a flour or semolina of a starchy plant, softened water, a starch, an ionic gelling agent and an emulsifier, forming the noodle product by cooking-extrusion of the mixture, bringing the noodle product into contact with water containing a cation which forms a gel with the ionic gelling agent, dewatering the noodle product, heat-treating it followed by water-cooling, dipping the water-cooled noodle product into an acidified water containing between about 0.5% to about 1.5% acid at ambient temperature for between about 60 seconds to about 150 seconds, cutting and portioning it, packaging it and in pack pasteurizing it.

* * * * *